UNITED STATES PATENT OFFICE.

WILLIAM N. BLAKEMAN, JR., OF NEW YORK, N. Y.

PROCESS OF PRESERVING OR RENOVATING BUTTER.

SPECIFICATION forming part of Letters Patent No. 520,513, dated May 29, 1894.

Application filed March 28, 1889. Serial No. 305,184. (No specimens.)

*To all whom it may concern:*

Be it known that I, WILLIAM N. BLAKEMAN, Jr., of the city of New York, in the county and State of New York, have invented a new and useful Process of Preserving or Renovating Butter, which I have named a "unifying process," which invention is fully set forth and described in the following specification.

The object of this invention is both to remove the cause of those fermentations which injuriously affect butter and to arrest their progress, if commenced, and at the same time to restore the volatile hydro-carbons and oxygenated hydro-carbons, to which all butter mainly owes its delicate flavor and appetizing characteristics, which have been lost by reason of such fermentations.

The invention will first be described in detail and then particularly set forth in the claims.

Much of the butter sent to market is of an inferior quality owing to the lack of cleanliness and care in its manufacture and packing, and the deterioration is often so rapid as to render it in a short time unfit for food. This change is brought about by the presence of caseous or cheesy matter retained in the butter, which sets up fermentations that produce free acids, such as lactic and butyric acids, and these in turn attack the volatile hydro-carbons and oxygenated hydro-carbons in which the delicate flavor and characteristics of butter mainly reside.

For the purpose of more clearly indicating the process, the butter to be treated may be regarded as already in a rancid condition.

The process of treatment is as follows:— The butter is first melted at a gentle heat, either by direct application to the vessel in which it is contained, or in a water bath, or in the heated water itself, and, while in the melted condition, it is thoroughly washed in water of nearly the same temperature, using agitation either by jets of steam or other mechanical means, and afterward allowed to repose and aggregate. The free acids will thus be dissolved out and all foreign matter will either be precipitated or rise to the surface, when they may be removed, and the butter drawn off and cooled or reserved for further treatment in its melted condition. One washing will generally be found sufficient, but any number may be availed of until the water is free from impurities. The supernatant butter, although now clarified, will have parted very largely with its flavor, and in many cases will have entirely lost it, owing to the fermentations, and melting and washing above referred to. As this peculiar and pleasing characteristic is now known to reside in the volatile hydro-carbons and oxygenated hydro-carbons, such as the glyceryl butyrates, or butyrins, as monobutyrin, dibutyrin and tributyrin, and as these can be now formed artificially by chemical synthesis, they can be now added to the purified butter in quantity as necessity or taste shall require. Butter thus treated and after working out all excess of water, and working in any of the well-known antiseptics now used in the process of butter making, will be found restored to its normal uniform, inviting, and appetizing condition.

In speaking of melting at a gentle heat I do not limit myself to exact temperatures, for, while under 140° Fahrenheit will be found sufficient in most cases, yet, owing to differences in the composition of butter at different seasons, and the extent of the change which that operated on may have undergone, a much higher heat may be required. Neither do I confine myself to any special menstruum for washing, for while water is always available, yet, the free acids being very soluble in milk, this alone or mixed with water, may be used; or an alkali-water may be employed, such as lime water, magnesia water, baryta water, with which bases the free acids above named form salts, the result being the formation of the lactate and butyrate of the alkali used, such as lactate or butyrate of lime, magnesia or baryta, and these may be recovered from the evaporated menstruum for purposes of distillation for free acids.

In cooling the butter at any stage of the process care must be taken to prevent lumpiness or crystallization, and for this purpose any method of agitation may be employed, such as straining through sieves or spraying or atomizing by jets of air or water; or any other mechanical disintegrating process may be used.

The volatile hydrocarbons or oxygenated hydrocarbons may be restored by adding the same at any period or step in the process, and whether the butter is in its fluid, semi fluid, or solid state.

The antiseptics used in the art of making and preserving butter are many and well known, such as chloride of sodium or common salt, nitrate of potash or niter, biborate of soda or borax, sugar, salicylates of the alkalies, &c., and any of these or a combination of the same may be used as practice shall dictate.

Coloring matter from any of the harmless vegetable infusions such as annotto, carrots, calendula flowers and the like, now extensively used, may be introduced or added without departing from my invention.

The presence of the volatile hydro-carbons is not essential to a good article of butter as these are not retained very long after the best butter is made, being the basis of the finer flavors obtained by the cow from certain meadow flowers, or grasses, ripening in the early summer and only then obtainable. These peculiar flavors therefore are only found in butter churned from milk obtained fresh at such season of the year—unless artificially supplied as hereinbefore described. Either volatile hydro-carbons, or oxygenated hydro-carbons, or both may therefore be restored to the butter, by my invention hereinbefore described.

I am aware that the mere washing of fats, or oils, to remove rancidity is not new, and such manipulation alone I do not claim; but, as of my invention,

I claim—

1. The process of preserving or renovating butter, consisting in first purifying the butter by washing in a menstruum capable of removing rancidity and then adding to the washed butter artificial hydrocarbons, substantially as and for the purposes set forth.

2. The process of preserving or renovating butter, consisting in first washing the butter in an alkaline solution and then adding to the washed butter artificial hydrocarbons, subtantially as and for the purposes set forth.

3. The process of preserving or renovating butter, consisting in purifying the same by washing in a menstruum capable of removing rancidity, then adding artificial hydrocarbons and disintegrating the mass by mechanical means, substantially as and for the purposes set forth.

4. The process of preserving or renovating butter, consisting in first purifying the butter by washing in a menstruum capable of removing rancidity and then adding to the washed butter glyceryl butyrates or butyrins, such as monobutyrin, dibutyrin, and tributyrin, one or more of them, substantially as and for the purposes set forth.

WM. N. BLAKEMAN, JR.

Witnesses:
W. A. DRIPPS,
JOHN TULLY.